June 6, 1950   J. G. ARBENZ   2,510,539
ANTIGLARE GLASSES
Filed April 10, 1947

Inventor
John G. Arbenz

By Clarence A. O'Brien
and Harvey B. Jacobson
Attorneys

Patented June 6, 1950

2,510,539

UNITED STATES PATENT OFFICE 2,510,539

ANTIGLARE GLASSES

John G. Arbenz, Wheeling, W. Va.

Application April 10, 1947, Serial No. 740,591

2 Claims. (Cl. 2—14)

This invention relates to new and useful improvements in anti-glare glasses and the primary feature of the present invention is to provide anti-glare glasses including semi-circular lenses which are adjustable to a raised and lowered position in the frame.

Another important feature of the present invention is to provide anti-glare glasses composed of a fixed frame portion and including a pivoted frame portion carrying semi-circular lenses adjustable to a lowered position to the fixed frame to protect the wearer's eyes from glare, and said pivoted frame being adjustable to a raised position to permit clear unobstructed vision to the wearer.

A further feature of the present invention is to provide a device of the character referred to including finger gripping means for raising or lowering the inner frame in either an up or down position to the outer frame.

A still further feature of the present invention is to provide a device of the class described that is simple and practical in construction, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
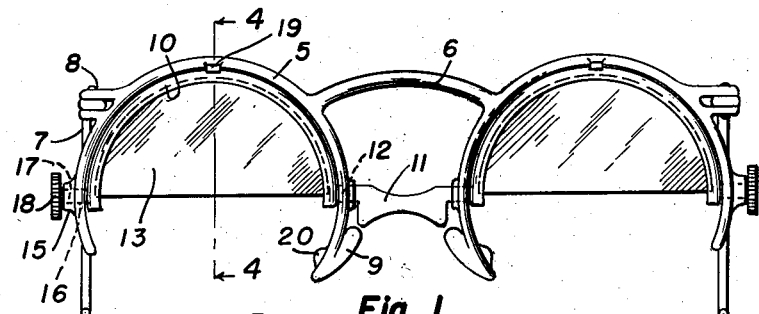
Figure 1 is a front elevational view of the antiglare glasses constructed in accordance with the present invention showing the inner frame and semi-circular lenses in a "raised" position to the outer frame.

Referring now to the drawings in detail wherein for the purpose of illustration, I have disclosed a preferred embodiment of the present invention, the numeral 5 represents a pair of semi-circular outer rims or frames connected by a bridge 6.

Temple pieces 7 are pivotally connected for horizontal swinging movement to the outer rims high on their sides as at 8.

The lower inner ends of said rims are formed into comfortable nose-pieces 9 which rest on either side of the nose as is conventional for such nose pieces.

A pair of semi-circular inner rims or frames 10 have their inner ends connected by a pivotal nose bridge 11 having its outer ends journaled as at 12 to the outer rims 5.

Semi-circular colored lenses 13 are suitably carried by the inner rims with the outer edge of said lenses fitted into a groove 14 in the inner rims.

Bosses 15 are formed on the lower outer ends of rims 5 and journaled for rotation in smooth bores 16 in said bosses and through the outer rim are pins 17 secured at one end to the lower outer ends of the inner rims.

Finger turning knobs 18 are carried by the outer ends of said pins for rotating the same.

Figure 2:
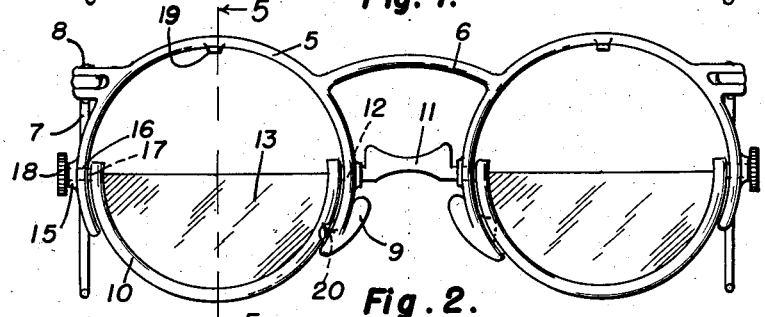
Figure 2 is a front elevational view thereof showing the inner frame and lenses in a lowered position.
Figure 3:
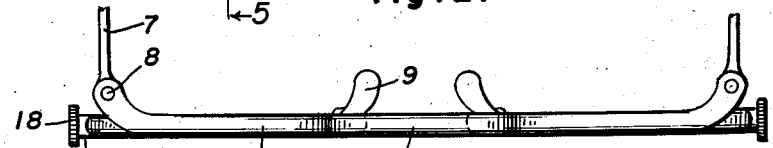
Figure 3 is a top plan view of the anti-glare glasses.
Figures 4, 5:
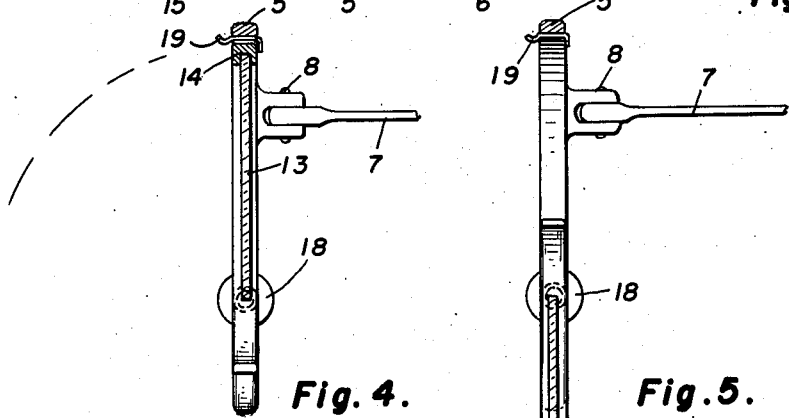
Figure 4 is an enlarged sectional view taken on line 4—4 of Figure 1.
Figure 5 is an enlarged sectional view taken on line 5—5 of Figure 2.

Resilient metal catches 19 are secured to the upper inner edge of rims 5 to lockably hold the inner rims in a raised position as shown in Figure 1, and integral stops 20 at the lower inner ends of the outer rims prevent the inner rims from swinging inwardly of the outer rims, when the inner rims are in a lowered position as shown in Figure 2.

It is obvious that in the drawings the nose bridge 11 is curved inwardly from its upper edge as well as its lower edge so that it will comfortably fit across the wearer's nose when the inner rims are in either a raised or lowered position.

To raise or lower the inner rims it is merely necessary to grip the finger knobs with the thumb and fore finger of each or either hand to swing the inner rims in the desired position to the outer rims to thus move the lens into or out of the path of focus of the wearer.

It should be noted, that the nose bridge 11 is eccentrically pivoted to the outer rims 5 so that when the inner rims 10 are moved to a lowered position, as shown in Figure 2, the user's line of vision will be below the straight edges of the lenses 13. However, when the inner rims 10 are moved to a raised position, as shown in Figure 1, the straight edges of the lenses will be spaced above the bearing surfaces of the nose bridge 11 so that the user's line of vision will be below the lower edges of the lenses.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A spectacle frame including a fixed frame portion and a pivoted frame portion, pivotal means connecting the pivotal frame portion for vertical swinging movement into and out of enclosed position within the fixed frame portion, and a semi-circular lens carried by the pivotal frame portion, said pivotal means including an eccentrically mounted nose bridge having first and second bearing surfaces, said lens having a straight edge in alignment with the first bearing surface of said nose bridge and spaced from the second bearing surface of said nose bridge.

2. An anti-glare device comprising a pair of outer spectacle frames, semi-circular inner spectacle frames supporting lenses and having inner and outer end portions, means pivotally securing the outer end portions of said inner frames to said outer frames, a nose rest journaled on and between said outer frames for rotation and connected to the inner end portions of said inner frames, said inner frames mounted for upward and downward swinging movement relative to said outer frames, means limiting downward swinging movement of said inner frames relative to said outer frames, and means for retaining said inner frames in a raised position, said lenses including straight edges, said nose bridge having first and second bearing surfaces for selectively engaging a user's nose when the inner frames are raised and lowered, said first bearing surface being in alignment with the straight edges of said lenses when the inner frames are lowered, said second bearing surface being spaced below the straight edges of said lenses when the inner frames are raised, said lenses being in registry with a user's eyes when the inner frames are in a lower position and said lenses being disposed above a user's eyes when said inner frames are in a raised position.

JOHN G. ARBENZ.

REFERENCES CITED

The following references are of record in the file of this patent:

UNITED STATES PATENTS

| Number | Name | Date |
|---|---|---|
| 291,778 | Roberts | Jan. 8, 1884 |
| 1,309,793 | Bergsvik | July 15, 1919 |
| 1,885,744 | Malcom | Nov. 1, 1932 |

FOREIGN PATENTS

| Number | Country | Date |
|---|---|---|
| 16,123 | Great Britain | of 1895 |
| 499,809 | France | Feb. 24, 1920 |